US009337681B2

(12) United States Patent
Sugiyama et al.

(10) Patent No.: US 9,337,681 B2
(45) Date of Patent: May 10, 2016

(54) POWER SOURCE SYSTEM, VEHICLE INCLUDING SAME, AND METHOD FOR CONTROLLING POWER SOURCE SYSTEM

(75) Inventors: Yoshinobu Sugiyama, Toyota (JP); Ryoji Oki, Toyota (JP); Wanleng Ang, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 14/118,331

(22) PCT Filed: May 27, 2011

(86) PCT No.: PCT/JP2011/062208
§ 371 (c)(1),
(2), (4) Date: Nov. 18, 2013

(87) PCT Pub. No.: WO2012/164643
PCT Pub. Date: Dec. 6, 2012

(65) Prior Publication Data
US 2014/0084818 A1    Mar. 27, 2014

(51) Int. Cl.
| | |
|---|---|
| H02P 1/02 | (2006.01) |
| H02J 7/00 | (2006.01) |
| H02J 7/14 | (2006.01) |
| H02H 9/00 | (2006.01) |
| H02J 7/02 | (2016.01) |
| B60L 11/12 | (2006.01) |
| B60L 11/14 | (2006.01) |
| B60L 11/18 | (2006.01) |

(52) U.S. Cl.
CPC ............... *H02J 7/007* (2013.01); *B60L 11/123* (2013.01); *B60L 11/14* (2013.01); *B60L 11/1816* (2013.01); *H02H 9/001* (2013.01); *H02J 7/027* (2013.01); *H02J 7/14* (2013.01); *H02J 7/1423* (2013.01); *H02J 7/1492* (2013.01); *H02P 1/02* (2013.01); *B60L 2270/20* (2013.01); *H02J 2007/143* (2013.01); *Y02T 10/7022* (2013.01); *Y02T 10/92* (2013.01)

(58) Field of Classification Search
USPC .......................................... 318/139; 320/128
See application file for complete search history.

(56) References Cited

U.S. PATENT DOCUMENTS

2004/0090807 A1*  5/2004  Youm ................. H02M 7/5387
                                                     363/132
2009/0310390 A1* 12/2009  Ohshima ........... H02M 7/53871
                                                     363/71

(Continued)

FOREIGN PATENT DOCUMENTS

| JP | A-07-67214 | 3/1995 |
| JP | A-2008-005658 | 1/2008 |

(Continued)

*Primary Examiner* — Bentsu Ro
*Assistant Examiner* — Said Bouziane
(74) *Attorney, Agent, or Firm* — Oliff PLC

(57) ABSTRACT

A first opening/closing device is connected between a power storage device and a first pair of power lines. A second opening/closing device is connected between the power storage device and a second pair of power lines. A third opening/closing device opens and closes an electric conduction path between the power storage device and each of the first opening/closing device and the second opening/closing device. When starting to externally supply electric power, a control device charges a first capacitor connected between the first pair of power lines by closing the first opening/closing device and the third opening/closing device, and thereafter charges a second capacitor connected between the second pair of power lines by closing the second opening/closing device and opening the third opening/closing device.

10 Claims, 10 Drawing Sheets

(56) References Cited

U.S. PATENT DOCUMENTS

2010/0019734 A1* 1/2010 Oyobe .................. B60K 6/365 320/162
2010/0164278 A1* 7/2010 Oyobe .................. B60K 6/365 307/9.1

FOREIGN PATENT DOCUMENTS

| JP | 2010259274 A | * 11/2010 |
| JP | A-2010-252520 | 11/2010 |
| JP | A-2010-259274 | 11/2010 |

* cited by examiner

POWER SOURCE SYSTEM, VEHICLE INCLUDING SAME, AND METHOD FOR CONTROLLING POWER SOURCE SYSTEM

TECHNICAL FIELD

The present invention relates to a power source system, a vehicle including the power source system, and a method for controlling the power source system. More particularly, the present invention relates to a technique for suppressing inrush current during external power supply in a power source system capable of charging a power storage device of a vehicle from an external power source and capable of supplying electric power from the power storage device to an external load.

BACKGROUND ART

As a power source system of this type, Japanese Patent Laying-Open No. 2010-259274 (Patent Document 1) discloses a power storage device charging pack having an external charging function and an external power supplying function, for example. The external charging function is of charging a high-voltage power storage device by receiving AC power from a commercial power source external to the vehicle and converting the AC power to DC power. The external power supplying function is of converting DC power of the high-voltage power storage device to AC power and supply the AC power to an external AC load when the AC load requests AC power. This power storage device charging pack includes: a high-voltage connection terminal connected to a high-voltage circuit that sends and receives high-voltage power; an external connection terminal connected to an external commercial power source or an external AC load; a system main relay unit provided between the high-voltage power storage device and the high-voltage connection terminal; a switching relay unit for switching connection of the high-voltage connection terminal or the external connection terminal to the high-voltage power storage device; and an AC/DC bidirectional charger capable of bidirectional conversion between AC power of the AC load and DC power.

According to Patent Document 1, the system main relay unit includes: a positive electrode side relay; a negative electrode side relay; and a precharging relay unit in which a precharging relay and a precharging resistor are connected in series. The switching relay unit further includes a positive electrode side switching relay and a negative electrode side switching relay. When externally charging the high-voltage power storage device or when externally supplying electric power from the high-voltage power storage device, the relays in the system main relay unit are disconnected and the positive electrode side switching relay and the negative electrode side switching relay are connected in the switching relay unit. During the external charging, AC power from the external commercial power source is converted into DC power by the AC/DC bidirectional charger, and is directly supplied to the high-voltage power storage device via the switching relay unit. Meanwhile, during the external power supply, DC power of the high-voltage power storage device is converted into AC power by the AC/DC bidirectional charger, and is supplied to the external AC load via the switching relay unit.

CITATION LIST

Patent Document

PTD 1: Japanese Patent Laying-Open No. 2010-259274

SUMMARY OF INVENTION

Technical Problem

In Patent Document 1, the AC/DC bidirectional charger is connected to a connection point of the positive electrode of the high-voltage power storage device and the positive electrode side relay of the system main relay unit via the positive electrode side switching relay of the switching relay unit, and is connected to a connection point of the negative electrode of the high-voltage power storage device and each of the negative electrode side relay and the precharging relay in the system main relay unit via the negative electrode side switching relay of the switching relay unit. Accordingly, when starting external power supply, i.e., when bringing each switching relay of the switching relay unit into a connection state, a large inrush current may flow from the high-voltage power storage device to the AC/DC bidirectional charger.

In order to limit the inrush current from flowing into the AC/DC bidirectional charger when starting the external power supply, the switching relay unit needs to be additionally provided with a precharging relay unit in which a precharging relay and a precharging resistor are connected in series in a manner similar to the system main relay unit. During a predetermined period of time after starting the external power supply, the switching relay connected to the precharging relay unit in parallel is brought into the disconnection state and the precharging relay is brought into the connection state, thereby limiting the inrush current by the precharging resistor.

However, the provision of the switching relay unit having the configuration similar to that of the system main relay unit results in large and complicated circuit configuration of the power source system.

Accordingly, the present invention has been made to solve such a problem, and has an object to provide: a power source system capable of suppressing inrush current by a simple circuit configuration during external power supply; a vehicle including such a power source system; and a method for controlling the power source system.

Solution to Problem

According to a certain aspect of the present invention, a power source system includes: a power storage device capable of charging/discharging; a first pair of power lines connected to the power storage device via a first opening/closing device; a first capacitor connected between the first pair of power lines; a second pair of power lines connected to the power storage device via a second opening/closing device; a second capacitor connected between the second pair of power lines; and a third opening/closing device for opening/closing an electric conduction path between the power storage device and each of the first opening/closing device and the second opening/closing device. The first opening/closing device includes: a first relay connected between one electrode of the power storage device and one power line of the first pair of power lines; and a second relay and a resistor connected in series between the other electrode of the power storage device and the other power line of the first pair of power lines. The power source system further includes a control device for charging the first capacitor by turning on the first relay and the second relay and closing the third opening/closing device, and thereafter charging the second capacitor by closing the second opening/closing device and opening the third opening/closing device.

Preferably, the power storage device is formed of a plurality of power storage batteries connected in series. The third opening/closing device is provided between the plurality of power storage batteries.

Preferably, the power source system further includes a power converter for bidirectionally converting electric power between the power storage device and outside via the second pair of power lines. The second capacitor is provided between the second opening/closing device and the power converter. When starting to supply electric power from the power storage device to an external load, the control device charges the first capacitor by turning on the first relay and the second relay and closing the third opening/closing device, and thereafter charges the second capacitor by closing the second opening/closing device and opening the third opening/closing device.

Preferably, the power source system further includes: an AC motor for generating vehicle driving power; and a power conversion unit for bidirectionally converting electric power between the power storage device and the AC motor via the first pair of power lines. The first capacitor is provided between the first opening/closing device and the power conversion unit. When starting to supply electric power from the power storage device to the power conversion unit, the control device charges the first capacitor by turning on the first relay and the second relay and closing the third opening/closing device.

Preferably, the power storage device is formed of a plurality of power storage batteries connected in series. The third opening/closing device is provided between the plurality of power storage batteries. The second opening/closing device includes: a third relay connected between one electrode of the power storage device and one power line of the second pair of power lines; a fourth relay connected between the other electrode of the power storage device and the other power line of the second pair of power lines; and a fifth relay connected between a connection point of the third opening/closing device and the other power line of the second pair of power lines.

Preferably, the control device is configured to provide: a first period in which the first capacitor is charged by turning on the first relay, the second relay, the fourth relay, and the fifth relay and opening the third opening/closing device; a second period in which the second capacitor is charged by turning on the third relay and turning off the fifth relay after the first period; a third period in which the first capacitor is charged by turning on the first relay and the second relay and closing the third opening/closing device after the second period; and a fourth period in which the second capacitor is charged by turning on the third relay and the fourth relay and opening the third opening/closing device after the third period.

According to another aspect of the present invention, a vehicle includes: a power source system; and a motor that receives electric power from the power source system to generate vehicle driving power. The power source system includes: a power storage device capable of charging/discharging; a first pair of power lines connected to the power storage device via a first opening/closing device; a first capacitor connected between the first pair of power lines; a second pair of power lines connected to the power storage device via a second opening/closing device; a second capacitor connected between the second pair of power lines; and a third opening/closing device for opening/closing an electric conduction path between the power storage device and each of the first opening/closing device and the second opening/closing device. The first opening/closing device includes: a first relay connected between one electrode of the power storage device and one power line of the first pair of power lines, and a second relay and a resistor connected in series between the other electrode of the power storage device and the other power line of the first pair of power lines. The power source system further includes a control device for charging the first capacitor by turning on the first relay and the second relay and closing the third opening/closing device, and thereafter charging the second capacitor by closing the second opening/closing device and opening the third opening/closing device.

According to another aspect of the present invention, there is provided a method for controlling a power source system. The power source system includes: a power storage device capable of charging/discharging; a first pair of power lines connected to the power storage device via a first opening/closing device; a first capacitor connected between the first pair of power lines; a second pair of power lines connected to the power storage device via a second opening/closing device; a second capacitor connected between the second pair of power lines; and a third opening/closing device for opening/closing an electric conduction path between the power storage device and each of the first opening/closing device and the second opening/closing device. The first opening/closing device includes a first relay connected between one electrode of the power storage device and one power line of the first pair of power lines, and a second relay and a resistor connected in series between the other electrode of the power storage device and the other power line of the first pair of power lines. The method includes the steps of: charging the first capacitor by turning on the first relay and the second relay and closing the third opening/closing device; and charging the second capacitor by closing the second opening/closing device and opening the third opening/closing device after charging the first capacitor.

Advantageous Effects of Invention

According to the present invention, when starting to supply electric power from the power storage device of the vehicle to a load external to the vehicle, inrush current can be limited by a resistor provided to limit the inrush current during start of the power source system. As a result, no resistor needs to be provided between the power storage device and the external load to limit the current. With such a simple configuration, inrush current can be suppressed during the start of the external power supply.

DESCRIPTION OF EMBODIMENTS

Figure 1:
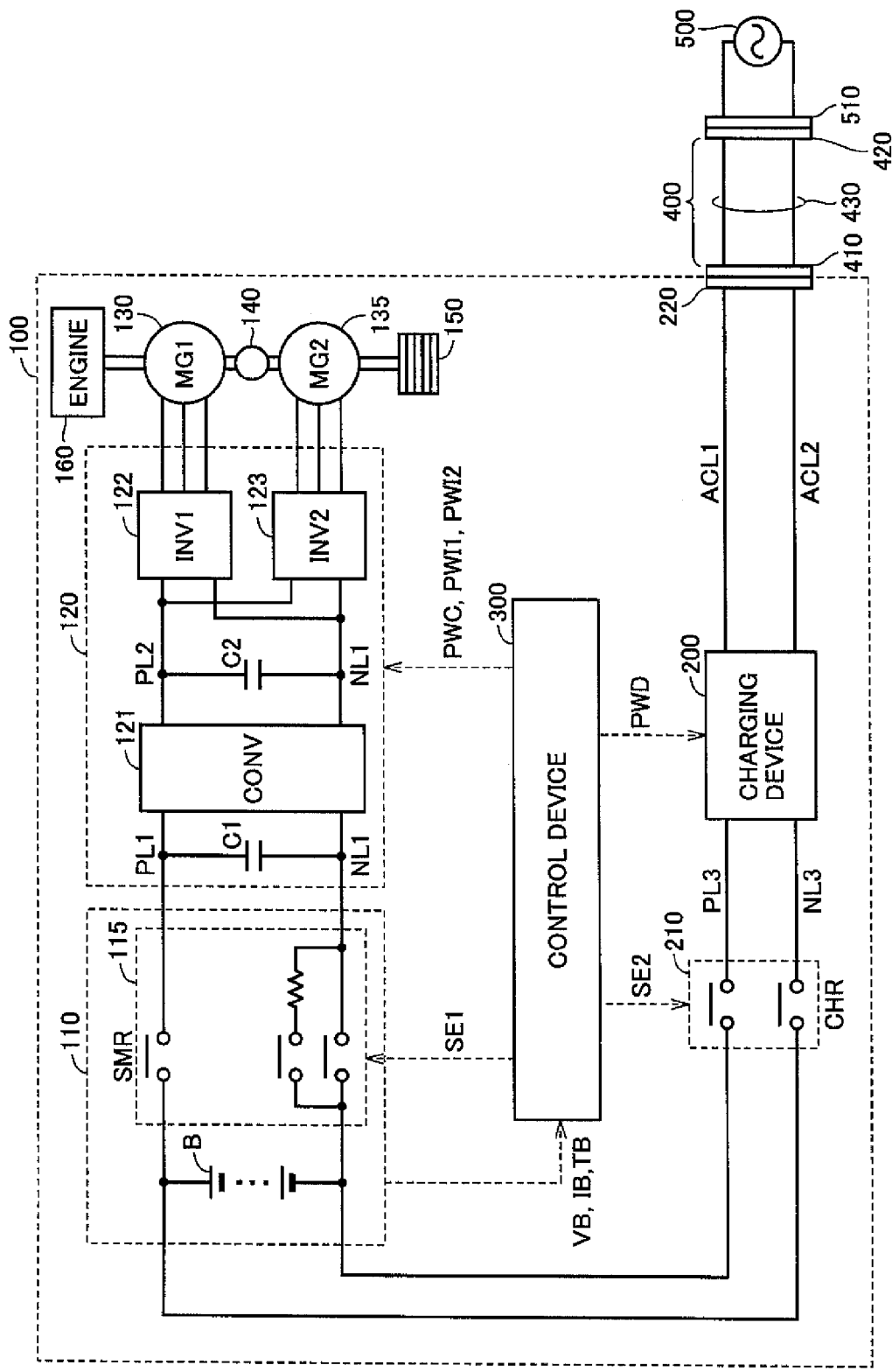
FIG. 1 is an entire block diagram of a vehicle including a power source system according to an embodiment of the present invention.

The following describes embodiments of the present invention in detail with reference to figures. It should be noted that the same reference characters in the figures indicate the same or corresponding portions.

[Basic Configuration of Vehicle]

FIG. 1 is an entire block diagram of a vehicle 100 including a power source system according to an embodiment of the present invention.

Referring to FIG. 1, vehicle 100 includes: a DC power source 110; a PCU (Power Control Unit) 120 serving as a driving device; motor generators 130, 135; power transmission gears 140; driving wheels 150, an engine 160; and a control device 300.

DC power source 110 includes a power storage device B and a system main relay (hereinafter, also referred to as "SMR") 115. Power storage device B is a power storage element configured to be chargeable/dischargeable. Representatively, a secondary battery is applied thereto, such as a lithium ion battery or a nickel hydride battery. Alternatively, power storage device B may be constructed of a power storage element other than a battery, such as an electric double layer capacitor. It should be noted that in the power source system according to the present embodiment, power storage device B includes a plurality of power storage batteries connected in series.

Via SMR 115, power storage device B is connected to PCU 120 for driving motor generators 130, 135. Moreover, power storage device B supplies PCU 120 with electric power for generating driving power for vehicle 100. Further, power storage device B stores electric power generated by motor generators 130, 135.

The relays included in SMR 115 respectively have ends connected to the positive electrode terminal and negative electrode terminal of power storage device B. The relays included in SMR 115 respectively have the other ends connected to a positive bus PL1 and a negative bus NL1 both connected to PCU 120. In accordance with a control signal SE1 sent from control device 300, SMR 115 is controlled to switch between the conductive state (ON) and the non-conductive state (OFF), thereby switching between supply and interruption of electric power between power storage device B and PCU 120. SMR 115 is employed as a representative example of a "first opening/closing device" capable of disconnecting electric connection between power storage device B and PCU 120. Any type of opening/closing device can be employed instead of SMR 115.

PCU 120 is configured to bidirectionally convert electric power between each of motor generators 130, 135 and DC power source 110. PCU 120 includes a converter (CONV) 121, and a first inverter (INV1) 122 and a second inverter (INV2) 123 respectively associated with motor generators 130 and 135.

Converter 121 is configured to perform bidirectional DC voltage conversion between DC power source 110 and a positive bus PL2, which transfers a DC link voltage of each of inverters 122, 123. Namely, the input/output voltage of power storage device B and the DC voltage between positive bus PL2 and negative bus NL1 are bidirectionally stepped up or down. Negative bus NL1 extends to inverters 122, 123 through converter 121. The operation of stepping up or down in converter 121 is controlled in accordance with a switching command PWC from control device 300.

Capacitor C1 is connected between positive bus PL1 and negative bus NL1, and reduces voltage fluctuation between positive bus PL1 and negative bus NL1. Capacitor C2 is connected between positive bus PL2 and negative bus NL1, and reduces voltage fluctuation between positive bus PL2 and negative bus NL1.

Each of first inverter 122 and second inverter 123 bidirectionally converts electric power between the DC power of positive bus PL2 and negative bus NL1 and the AC power supplied to/from motor generators 130 and 135. Mainly, in accordance with a switching command PWI1 from control device 300, first inverter 122 converts AC power, which is generated by motor generator 130 using output of engine 160, into DC power, and supplies it to positive bus PL2 and negative bus NL1. Accordingly, also during vehicle traveling, power storage device B can be actively charged using the output of engine 160.

Further, when starting engine 160, in accordance with switching command PWI1 from control device 300, first inverter 122 converts DC power supplied from DC power source 110 into AC power, and supplies it to motor generator 130. In this way, engine 160 can be started using motor generator 130 as a starter.

In accordance with a switching command PWI2 from control device 300, second inverter 123 converts DC power supplied via positive bus PL2 and negative bus NL1 into AC power, and supplies it to motor generator 135. In this way, motor generator 135 generates driving power for vehicle 100.

Meanwhile, during regenerative braking of vehicle 100, motor generator 135 generates AC power as the speed of driving wheels 150 is reduced. In doing so, in accordance with a switching command PWI2 from ECU 300, second inverter 123 converts the AC power generated by motor generator 135 into DC power, and supplies it to positive bus PL2 and negative bus NL1. Accordingly, while reducing speed or traveling down a sloping road, power storage device B is charged.

Control device 300 is representatively constituted of an electronic control unit (ECU). The ECU mainly includes: a CPU (Central Processing Unit); a memory area such as a RAM (Random Access Memory) or a ROM (Read Only Memory); and an input/output interface. In control device 300, the CPU reads out, to the RAM, a program stored in advance in the ROM and executes it, thereby performing control associated with the vehicle traveling and the charging/discharging. It should be noted that at least a part of the ECU may be configured to perform a predetermined numerical/logical calculation process using hardware such as an electronic circuit.

As information sent to control device 300, FIG. 1 illustrates battery data (battery voltage VB, battery current IB, and battery temperature TB) sent from a monitoring unit not shown in the figure. Although not shown in the figure, control device 300 also receives: a DC voltage detection value detected by a voltage sensor (not shown) disposed between the lines of positive bus PL2 and negative bus NL1; a current detection value of each phase of motor generators 130, 135; and a rotation angle detection value of each of motor generators 130, 135.

Each of motor generators 130, 135 is an AC rotating electrical machine, such as a permanent-magnet type synchronous motor including a rotor having a permanent magnet embedded therein. Output torque from each of motor generators 130, 135 is transmitted to driving wheels 150 and engine 160 via power transmission gears 140 including a speed reducer and a power split device, whereby vehicle 100 travels. Motor generator 135 is capable of generating electric power using rotational force from driving wheels 150 during regenerative braking of vehicle 100. The electric power thus generated is converted by PCU 120 into charging power for power storage device B. In the present embodiment, it is assumed that motor generator 130 is exclusively operated as a generator driven by engine 160 to generate electric power, whereas motor generator 135 is exclusively operated as a motor for driving driving wheels 150 for the purpose of traveling of vehicle 100.

It should be noted that the present embodiment illustrates an exemplary configuration in which two pairs of motor generators and inverters are provided, but one pair of a motor generator and an inverter or more than two pairs of motor generators and inverters may be provided.

Further, in the present embodiment, vehicle 100 is illustrated as a hybrid vehicle, but the configuration of vehicle 100 is not limited as long as vehicle 100 is a vehicle including a motor for generating vehicle driving power using electric power from power storage device B. In other words, examples of vehicle 100 includes an electric vehicle or a fuel cell vehicle each having no engine, in addition to the hybrid vehicle having the engine and the motor to generate vehicle driving power as shown in FIG. 1.

The power source system of the vehicle is formed of a portion of the illustrated configuration of vehicle 100 other than motor generators 130, 135, power transmission gears 140, engine 160, and driving wheels 150.

The power source system according to the present embodiment has a function of charging power storage device B with electric power supplied from an external power source 500. Further, the power source system has a function of supplying an external load (not shown) with electric power stored in power storage device B, when the external load requests electric power. In other words, the power source system is capable of charging power storage device B from external power source 500 (external charging), and is also capable of supplying electric power from power storage device B to the external load (external power supply).

Specifically, as a configuration for the external charging of power storage device B and the external power supply from power storage device B, the power source system further includes a charging device 200, a charging relay (CHR) 210, and a connection unit 220.

Connection unit 220 is provided in the body of vehicle 100. In the case where vehicle 100 receives electric power from external power source 500, a charging connector 410 of a charging cable 400 is connected to connection unit 220. When a plug 420 of charging cable 400 is connected to a receptacle 510 of external power source 500, electric power from external power source 500 is supplied to vehicle 100 via an electric wire portion 430 of charging cable 400.

On the other hand, in the case where electric power is supplied from vehicle 100 to the external load, a discharging receptacle (not shown) of a power supply cable is connected to connection unit 220. When a plug of the external load is connected to a discharging receptacle of the power supply cable, electric power from vehicle 100 is supplied to the external load via an electric wire portion of the power supply cable.

Charging device 200 is connected to connection unit 220 via power lines ACL1, ACL2. Further, charging device 200 is connected to power storage device B via CHR 210. Further, during the external charging, in accordance with a control signal PWD from control device 300, charging device 200 converts AC power supplied from external power source 500 into DC power and supplies it to power storage device B. Meanwhile, during the external power supply, in accordance with a control signal PWD from control device 300, charging device 200 converts DC power supplied from power storage device B into AC power and supplies it to the external load. It should be noted that charging device 200 includes: a bidirectional AC/DC converter for bidirectionally converting electric power between AC power and DC power; and a capacitor C3 for reducing voltage fluctuation between positive bus PL3 and negative bus NL3 (see FIG. 2).

The relays included in CHR 210 respectively have ends connected to the positive electrode terminal and the negative electrode terminal of power storage device B. The relays included in CHR 210 respectively have the other ends connected to a positive bus PL3 and a negative bus NL3 both connected to charging device 200. In accordance with a control signal SE2 sent from control device 300, CHR 210 is controlled to switch between the conductive state (ON) and the non-conductive state (OFF), thereby switching between supply and interruption of electric power between power storage device B and charging device 200. CHR 210 is employed as a representative example of a "second opening/closing device" capable of disconnecting electric connection between power storage device B and charging device 200. Any type of opening/closing device can be employed instead of CHR 210.

[First Embodiment]

In a power source system according to an embodiment of the present invention, in the case where DC power from power storage device B is converted to AC power and the converted AC power is supplied to an external load, the relays included in SMR 115 and CHR 210 are controlled to be turned on/off in accordance with FIG. 2 to FIG. 4 described below so as to perform initial charging (precharging) control for a capacitor C3 included in charging device 200.

Figure 2:
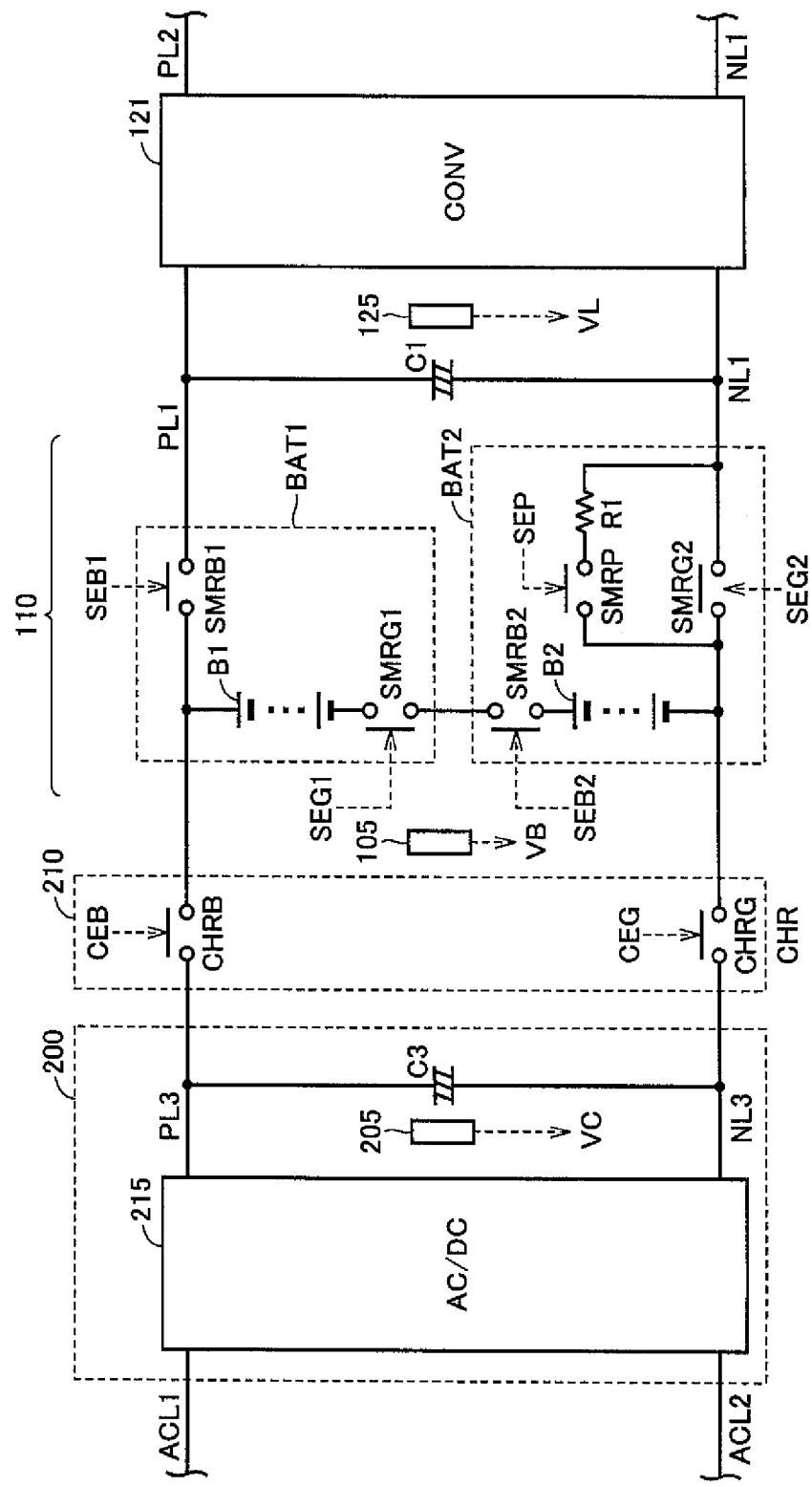
FIG. 2 illustrates an operation of a power source system according to a first embodiment of the present invention.

FIG. 2 illustrates an operation of a power source system according to the first embodiment of the present invention.

Referring to FIG. 2, in the power source system according to the first embodiment, DC power source 110 includes two battery packs BAT1, BAT2 connected in series between positive bus PL1 and negative bus NL1.

Battery pack BAT1 includes: a power storage battery B1 including a plurality of secondary cells connected in series; and relays SMRB1, SMRG1. Relay SMRB1 is connected between the positive electrode terminal of power storage battery B1 and positive bus PL1. Relay SMRG1 is connected between the negative electrode terminal of power storage battery B1 and relay SMRB2 provided in battery pack BAT2. Relay SMRB1 is turned on/off based on a control signal SEB1 sent from control device 300 (FIG. 1). Relay SMRG1 is turned on/off based on a control signal SEG1 sent from control device 300.

Battery pack BAT2 includes: a power storage battery 132 including a plurality of secondary cells connected in series; relays SMRB2, SMRP, SMRG2; and a resistor R1. Relay SMRB2 is connected between relay SMRG1 provided in battery pack BAT1 and the positive electrode terminal of power storage battery B2. Relay SMRG2 is connected between the negative electrode terminal of power storage battery B2 and negative bus NL1. Relay SMRP and resistor R1, which are connected to each other in series, are connected to relay SMRG2 in parallel. Relay SMRB2 is turned on/off based on a control signal SEB2 sent from control device 300.

Relay SMRG2 is turned on/off based on a control signal SEG2 sent from control device 300. Relay SMRP is turned on/off based on a control signal SEP sent from control device 300.

It should be noted that by turning on relays SMRG1 and SMRB2, power storage battery B1 of battery pack BAT1 and power storage battery B2 of battery pack BAT2 are connected to each other in series. Power storage battery B1 and power storage battery B2 form power storage device B shown in FIG. 1. Relays SMRG1 and SMRB2 are turned on/off based on control signals SEG1 and SEB2 sent from control device 300, thereby switching between electric connection and disconnection between power storage device B and each of SMR 115 and CHR 210. Relays SMRG1 and SMRB2 are employed as a representative example of a "third opening/closing device" capable of disconnecting the charging/discharging path for power storage device B. Any type of opening/closing device can be employed instead of relays SMRG1 and SMRB2.

A voltage sensor 105, which is provided in a monitoring unit, detects a DC voltage (battery voltage) VB output from power storage device B. Further, relay SMRB1 inserted in positive bus PL1, relay SMRG2 inserted in negative bus NL1, and relay SMRP and resistor R1 connected in series form SMR 115 shown in FIG. 1.

Here, in the configuration shown in FIG. 2, when the power source system is requested to be started by turning on an ignition key, control device 300 precharges capacitor C1 by turning on relays SMRB1 and SMRP included in SMR 115. By turning on relays SMRB1 and SMRP when precharging capacitor C1, a precharging current for capacitor C1 can be limited by resistor R1. It should be noted that after completion of starting the system, power loss takes place due to resistor R1, so that electric power is supplied from power storage device B not via resistor R1 by turning off relay SMRP to separate resistor R1 from negative bus NL1 and turning on relay SMRG2.

Charging device 200 includes a bidirectional AC/DC converter 215 and capacitor C3. Bidirectional AC/DC converter 215 bidirectionally converts electric power between each of positive bus PL3 and negative bus NL3 and each of power line ACL1 and power line ACL2, based on control signal PWD from control device 300. Capacitor C3 is connected between positive bus PL3 and negative bus NL3, and reduces voltage fluctuation between positive bus PL3 and negative bus NL3.

CHR 210 includes a relay CHRB and a relay CHRG. Relay CHRB is connected between the positive electrode terminal of power storage battery B1 and positive bus PL3. Relay CHRG is connected between the negative electrode terminal of power storage battery B2 and negative bus NL3. Relay CHRB is turned on/off based on a control signal CEB sent from control device 300. Relay CHRG is turned on/off based on a control signal CEG sent from control device 300.

A voltage sensor 125 detects a voltage across capacitor C1, i.e., DC voltage VL, and sends the detection value thereof to control device 300. A voltage sensor 205 detects a voltage across capacitor C3, i.e., direct voltage VC, and sends the detection value thereof to control device 300.

In the configuration shown in FIG. 1 and FIG. 2, in the case where DC power is supplied from power storage device B (power storage batteries B1 and B2) to the external load, control device 300 precharges capacitor C3. FIG. 3 is a flowchart for illustrating a process concerned with the precharging of capacitor C3 by control device 300. It should be noted that the process of this flowchart is invoked from a predetermined main routine and performed whenever a certain period of time passes or a predetermined condition is established.

Figure 3:
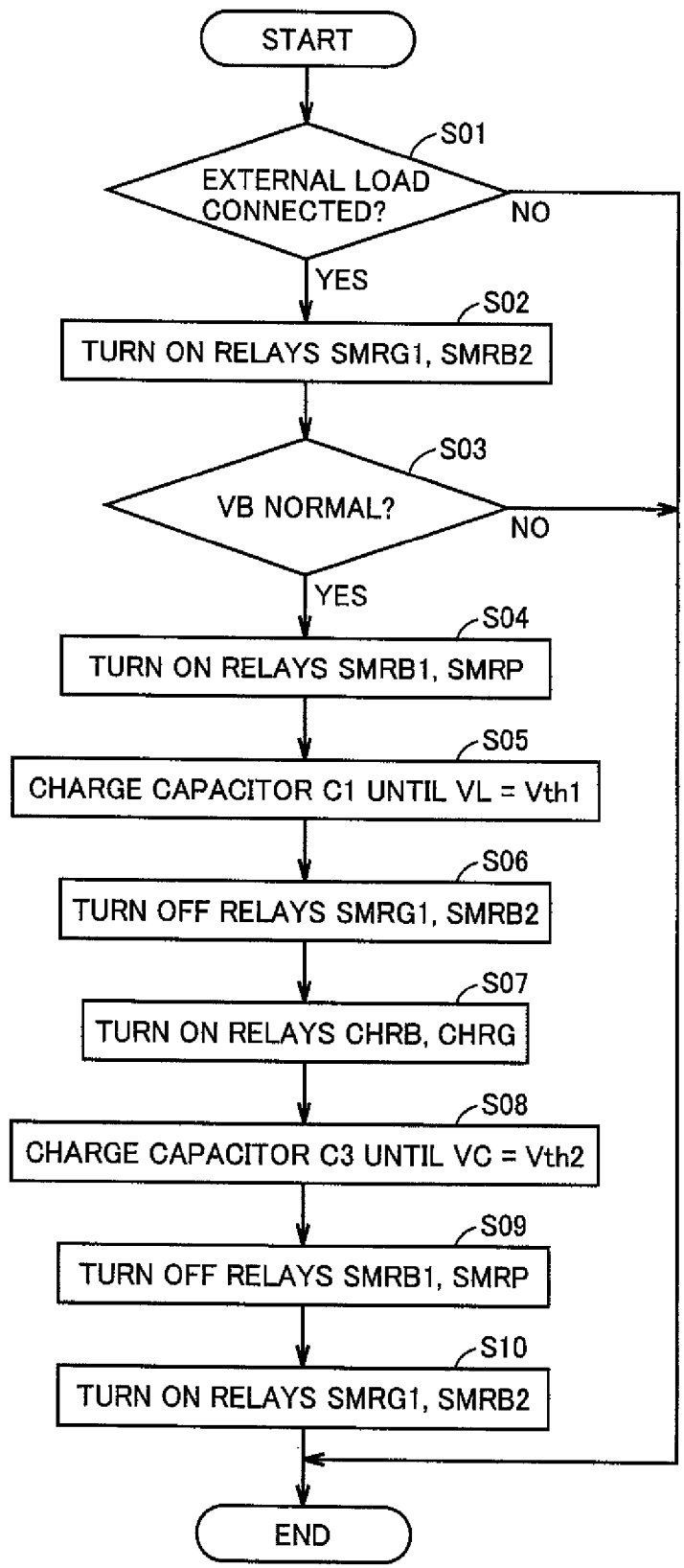
FIG. 3 is a flowchart for illustrating a process concerned with precharging of a capacitor by a control device in the first embodiment of the present invention.

Further, it is assumed that each of the steps of the flowchart of FIG. 3 is implemented by a software process performed by control device 300 (execution of a stored program by a CPU) or a hardware process (operation of a dedicated electronic circuit).

Referring to FIG. 3, in a step S01, control device 300 determines whether or not an external load is connected to connection unit 220, based on a signal sent from connection unit 220. When control device 300 determines that no external load is connected to connection unit 220 (determined as NO in step S01), the process is terminated without performing a series of subsequent processes.

On the other hand, when it is determined that an external load is connected to connection unit 220 (determined as YES in step S01), control device 300 turns on relays SMRG1 and SMRB2 in a step S02 by activating control signals SEG1 and SEB2 to the H (logic high) level. Accordingly, power storage battery B1 and power storage battery B2 are electrically connected to each other. Further, power storage device B is electrically connected to SMR 115 and CHR 210.

Next, in a step S03, control device 300 detects an output DC voltage of power storage device B, i.e., battery voltage VB, using voltage sensor 105. Then, control device 300 determines whether or not the detection value of battery voltage VB falls within a normal range. It should be noted that the normal range of battery voltage VB has been set in advance based on each of the voltages of battery packs BAT1, BAT2. When it is determined that battery voltage VB falls out of the normal range (determined as NO in step S03), control device 300 terminates the process without performing the series of subsequent processes.

On the other hand, when it is determined that battery voltage VB falls within the normal range (determined as YES in step S03), control device 300 turns on relays SMRB1 and SMRP in a step S04 by activating control signals SEB1 and SEP to the H level. In this way, electric power is started to be supplied from DC power source 110 to positive bus PL1 and negative bus NL1.

Capacitor C1 is charged with the electric power supplied to positive bus PL1 and negative bus NL1. In a step S05, control device 300 charges capacitor C1 to a voltage Vth1 set in advance, based on DC voltage VL detected by voltage sensor 125.

When DC voltage VL reaches voltage Vth1, control device 300 deactivates control signals SEG1 and SEB2 to the L (logic low) level in a step S06, thereby turning off relays SMRG1 and SMRB2. In this way, electric connection between power storage battery B1 and power storage battery B2 is disconnected. Further, electric connection between power storage device B and each of SMR 115 and CHR 210 is disconnected, thereby disconnecting discharging path of power storage device B.

Further, control device 300 activates control signals CEB and CEG to the H level in a step S07, thereby turning on relays CHRB and CHRG. In this way, positive bus PL1 and negative bus NL1 are electrically connected to positive bus PL3 and negative bus NL3. The DC voltage is supplied from capacitor C1 to capacitor C3 via positive bus PL1, relays SMRB1, CHRB, and positive bus PL3, thereby charging capacitor C3. In a step S08, control device 300 charges capacitor C3 to a voltage Vth2 set in advance, based on DC voltage VC detected by voltage sensor 205.

When DC voltage VC reaches a voltage Vth2, control device 300 turns off relays SMRB1 and SMRP in a step S09 by deactivating control signals SEB1 and SEP to the L level. Accordingly, power storage device B is disconnected from positive bus PL1 and negative bus NL1. Further, control device 300 activates control signals SEG1 and SEB2 to the H level in a step S10, thereby turning on relays SMRG1 and SMRB2. In this way, power storage device B is electrically connected to positive bus PL3 and negative bus NL3.

Next, control device 300 generates control signal PWD for converting DC power, which is supplied from power storage device B, into AC power that can be supplied to the external load. This control signal PWD is sent to bidirectional AC/DC converter 215. In this way, electric power is started to be supplied from power storage device B to the external load.

Here, voltage Vth1 in step S05 is used to determine whether or not capacitor C1 has been charged until voltage VL of capacitor C1 becomes substantially equal to battery voltage VB. This voltage Vth1 usable herein is of a value such that the absolute value of a difference from battery voltage VB falls within a range equal to or less than a predetermined threshold value. When voltage VL of capacitor C1 reaches voltage Vth1, control device 300 determines that a condition of ending the charging of capacitor C1 is established, and disconnects the discharging path of power storage device B in step S06. Then, in step S07, electric power stored in capacitor C1 is employed to charge capacitor C3.

Likewise, voltage Vth2 in step S08 is used to determine whether or not capacitor C3 has been charged until voltage VC of capacitor C3 becomes substantially equal to battery voltage VB. This voltage Vth2 usable herein is of a value such that the absolute value of a difference from battery voltage VB falls within a range equal to or less than a predetermined threshold value, By thus charging capacitor C3 until voltage VC becomes substantially equal to battery voltage VB, voltage difference between voltage VC of capacitor C3 and battery voltage VB is made small even when turning on relays SMRG1 and SMRB2 in step S10, thereby preventing occurrence of inrush current.

It should be noted that when the condition of ending the charging of capacitor C3 is established in step S08, each of voltage VC of capacitor C3 and voltage VL of capacitor C1 becomes substantially equal to battery voltage VB. On the other hand, capacitor C3 is charged with the electric power stored in capacitor C1 in step S05, so that voltage VC of capacitor C3 reaches a voltage lower than voltage Vth1. Voltage VC on this occasion is determined by a capacitance ratio between capacitors C1 and C3, When voltage VC of capacitor C3 does not reach voltage Vth2 due to this capacitance ratio, control device 300 repeatedly charges capacitor C1 and capacitor C3 until voltage VC reaches voltage Vth2.

Further, by turning off relays SMRG1 and SMRB2 in step S06, the discharging path of power storage device B is disconnected, but the discharging path may be disconnected by turning off only one of relays SMRG1 and SMRB2.

Figure 4:
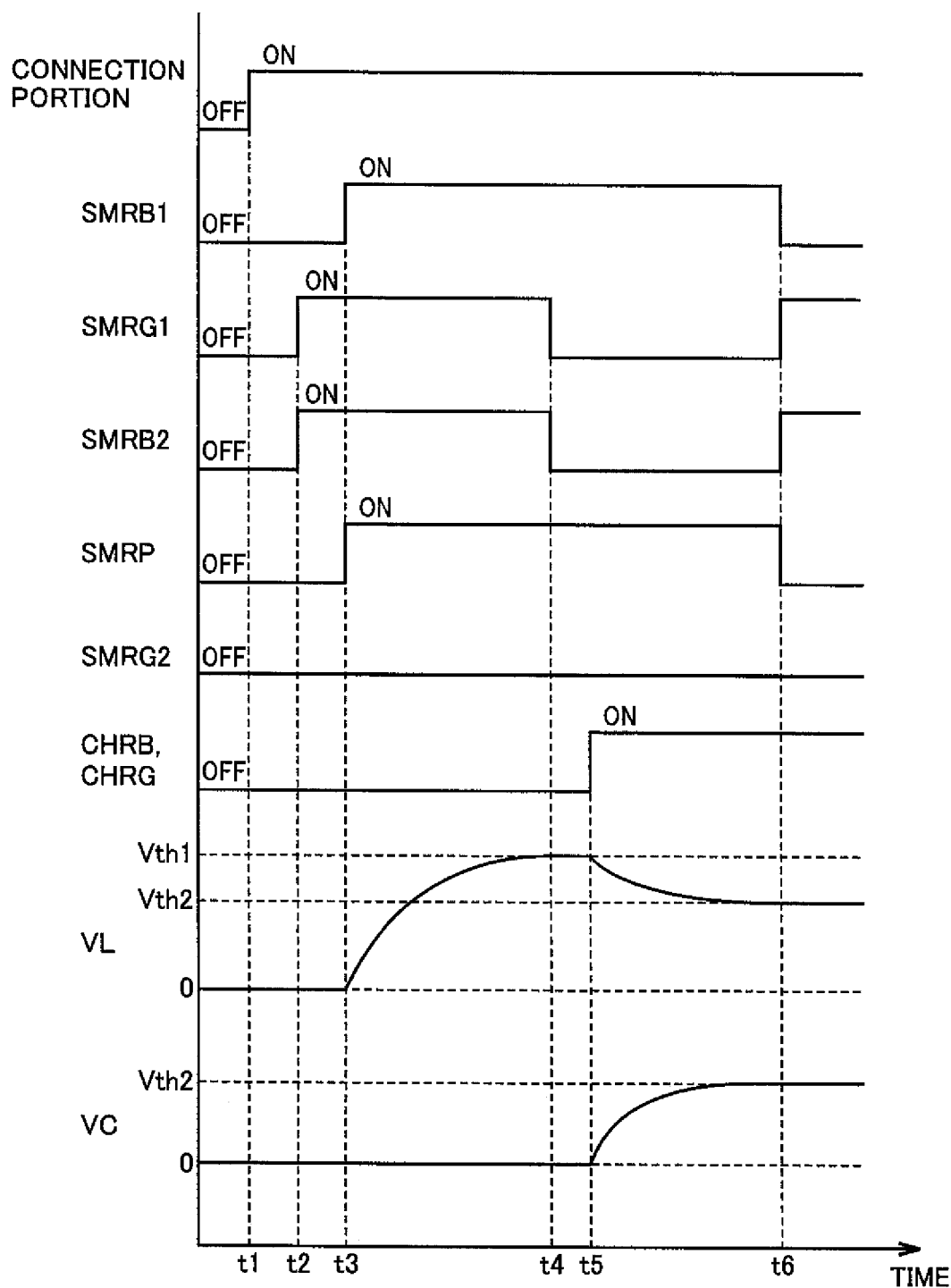
FIG. 4 is a timing chart for illustrating on/off control over a relay when starting external power supply.

FIG. 4 is a timing chart for illustrating on/off control over a relay when starting the external power supply.

Referring to FIG. 4, when an external load is connected to connection unit 220 at a time t1, relays SMRG1 and SMRB2 are turned on at a time t2. Next, when relays SMRB1 and SMRP are turned on at a time t3, DC voltage VB supplied from power storage device B is supplied to capacitor C1 via relays SMRB1 and SMRP, thereby starting charging of capacitor C1. On this occasion, voltage VL of capacitor C1 is gradually increased after time t3 at which the charging of capacitor C1 is started.

When voltage VL reaches voltage Vth1 at a time t4, relays SMRG1 and SMRB2 are turned off and relays CHRB and CHRG are turned on at a time t5. DC voltage VL of capacitor C1 is supplied to capacitor C3 via positive bus PL1, relays SMRB1 and CHRB, and positive bus PL3, thereby starting discharging of capacitor C1 and charging of capacitor C3. In this way, after time t5, voltage VL is decreased and voltage VC is increased.

When voltage VC reaches voltage Vth2 at a time t6, relays SMRB1 and SMRP are turned off and relays SMRG1 and SMRB2 are turned on again. In this way, power storage device B is electrically connected to positive bus PL3 and negative bus NL3.

As described above, according to the first embodiment of the present invention, when supplying electric power from power storage device B of the vehicle to the external load, capacitor C3 provided in charging device 200 is charged with the DC voltage supplied from capacitor C1 provided in PCU 120 via relay SMRP and resistor R1 for the precharging of capacitor C1. In this way, the precharging current for capacitor C3 can be limited by resistor R1 for precharging of capacitor C1. By using resistor R1 as a current limiting element for both of capacitors C1 and C3, a resistor for precharging does not need to be newly provided in CHR 210. As a result, the configuration of the power source system can be simplified.

[Second Embodiment]

In the second embodiment of the present invention, the following describes a process concerned with precharging of capacitor C3 by control device 300 in the case where the DC power source includes three battery packs connected in series between positive bus PL1 and negative bus NL1. It should be noted that the configuration of the power source system in the second embodiment of the present invention is the same as that in FIG. 1 and FIG. 2 apart from DC power source 110A, and therefore is not described repeatedly in detail.

Figure 5:
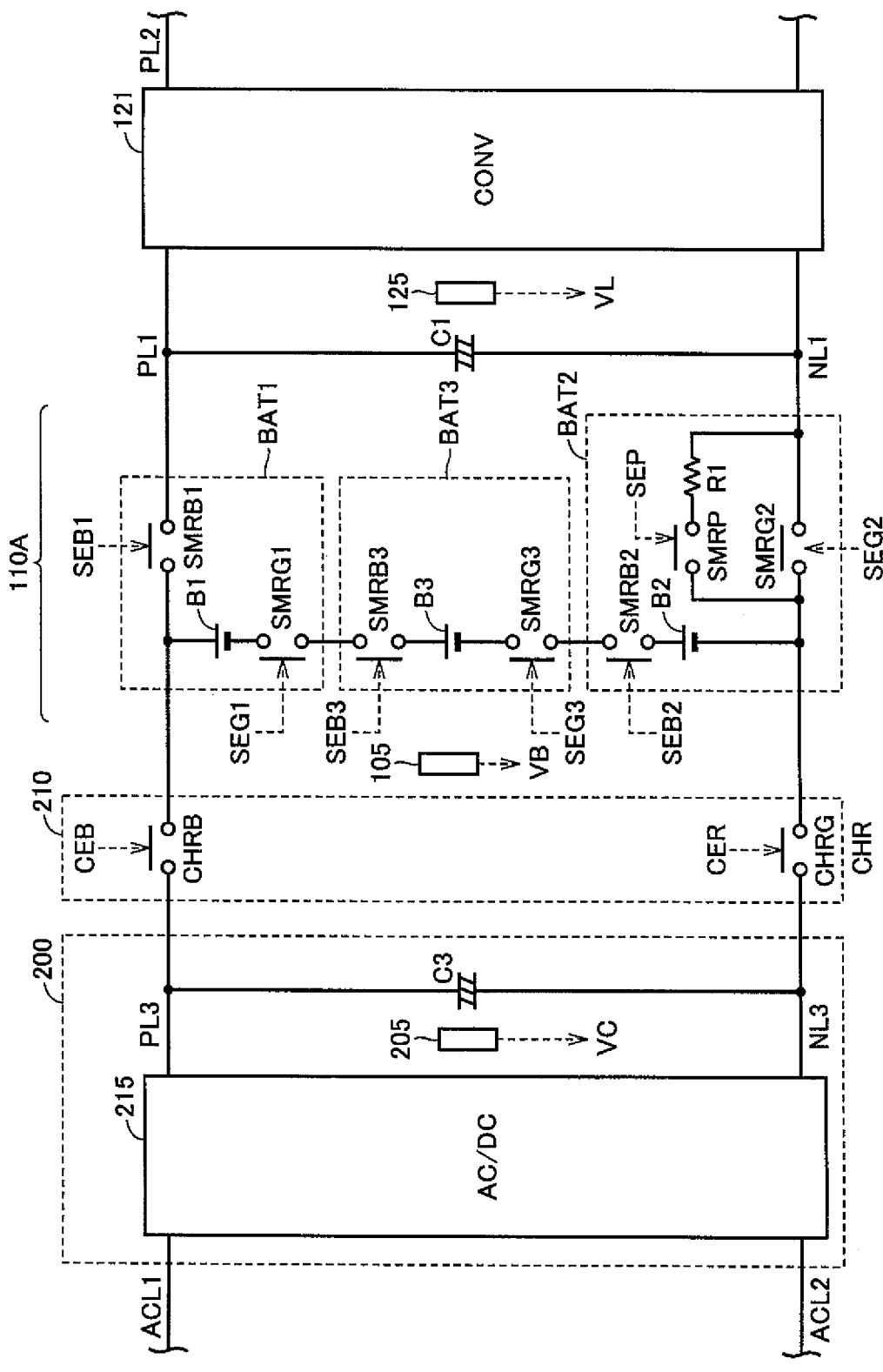
FIG. 5 illustrates an operation of a power source system according to a second embodiment of the present invention.

FIG. 5 illustrates an operation of a power source system according to the second embodiment of the present invention.

Referring to FIG. 5, in the power source system according to the second embodiment, DC power source 110A includes three battery packs BAT1 to BAT3 connected in series between positive bus PL1 and negative bus NL1.

Battery pack BAT1 includes: a power storage battery B1 including a plurality of secondary cells connected in series; and relays SMRB1, SMRG1. Relay SMRB1 is connected between the positive electrode terminal of power storage battery B1 and positive bus PL1. Relay SMRG1 is connected between the negative electrode terminal of power storage battery B1 and relay SMRB3 provided in battery pack BAT3. Relay SMRB1 is turned on/off based on a control signal SEB1 sent from control device 300. Relay SMRG1 is turned on/off based on a control signal SEG1 sent from control device 300.

Battery pack BAT2 includes: a power storage battery B2 including a plurality of secondary cells connected in series; relays SMRB2, SMRP, SMRG2; and a resistor R1. Relay SMRB2 is connected between relay SMRG3 provided in battery pack BAT3 and the positive electrode terminal of power storage battery B2. Relay SMRG2 is connected between the negative electrode terminal of power storage battery B2 and negative bus NL1. Relay SMRP and resistor R1, which are connected to each other in series, are connected to relay SMRG2 in parallel. Relay SMRB2 is turned on/off based on a control signal SEB2 sent from control device 300. Relay SMRG2 is turned on/off based on a control signal SEG2 sent from control device 300. Relay SMRP is turned on/off based on a control signal SEP sent from control device 300.

Battery pack BAT3 includes: a power storage battery 133 including a plurality of secondary cells connected in series; and relays SMRB3, SMRG3. Relay SMRB3 is connected between the positive electrode terminal of power storage battery B3 and relay SMRG1 provided in battery pack BAT1.

Relay SMRG3 is connected between the negative electrode terminal of power storage battery B3 and relay SMRB2 provided in battery pack BAT2. Relay SMRB3 is turned on/off based on a control signal SEB3 sent from control device 300. Relay SMRG3 is turned on/off based on a control signal SEG3 sent from control device 300.

In the second embodiment, by turning on relays SMRG1, SMRB3, SMRG3, and SMRB2, power storage battery B1 of battery pack BAT1, power storage battery B2 of battery pack BAT 3, and power storage battery B2 of battery pack BAT2 are connected to one another in series. Power storage batteries B1, B2, and B3 form power storage device B shown in FIG. 1. Relays SMRG1, SMRB3, SMRG3, and SMRB2 correspond to the "third opening/closing device" in the present invention. It should be noted that any type of opening/closing device can be employed instead of relays SMRG1, SMRB3, SMRG3, and SMRB2.

A voltage sensor 105 detects a DC voltage (battery voltage) VB output from power storage device B. Further, relay SMRB1 inserted in positive bus PL1, relay SMRG2 inserted in negative bus NL1, and relay SMRG2 and resistor R1 connected in series form SMR 115 shown in FIG. 1.

Figure 6:
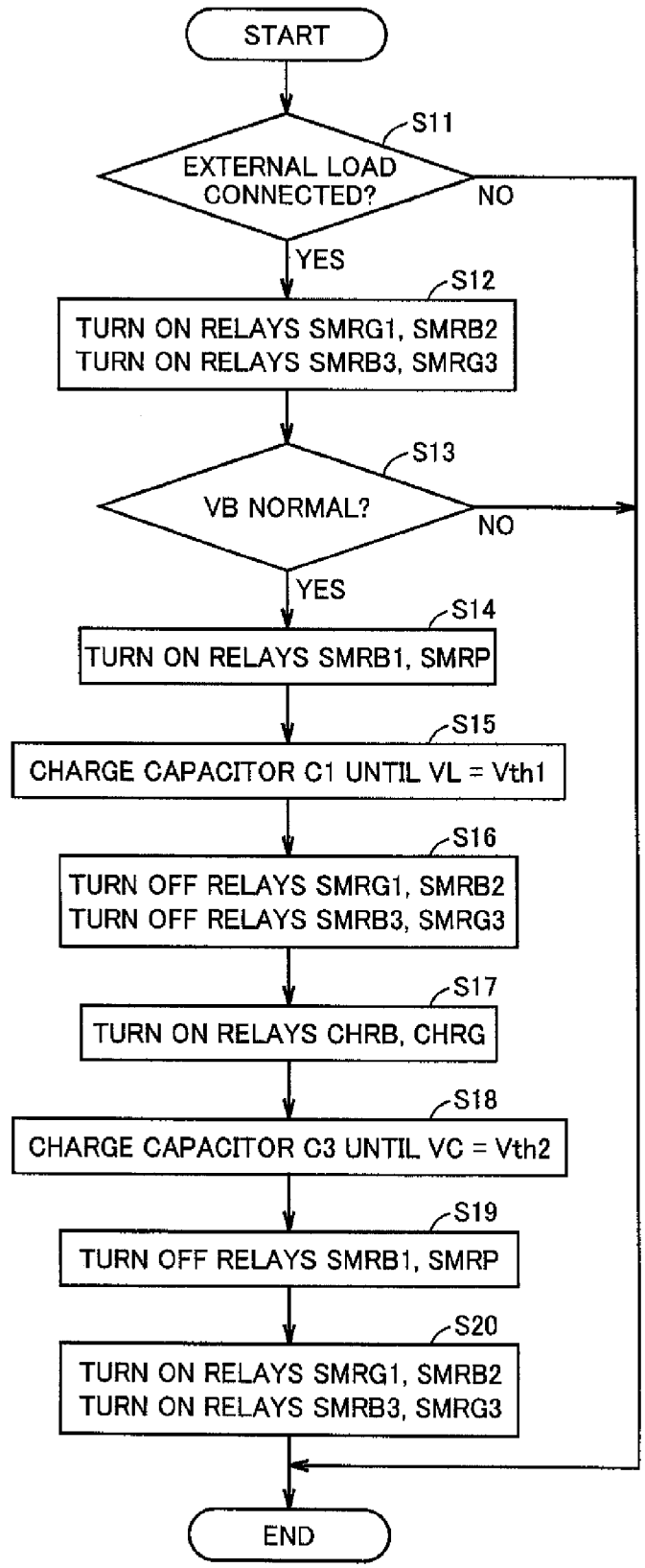
FIG. 6 is a flowchart for illustrating a process concerned with precharging of a capacitor by a control device in the second embodiment.

In the configuration shown in FIG. 5, in the case where DC power is supplied from power storage device B (power storage batteries B1 to B3) to the external load, control device 300 precharges capacitor C3. FIG. 6 is a flowchart for illustrating a process concerned with the precharging of capacitor C3 by control device 300 in the second embodiment. It should be noted that the process of this flowchart is invoked from a predetermined main routine and performed whenever a certain period of time passes or a predetermined condition is established. Further, it is assumed that each of the steps of the flowchart of FIG. 6 is implemented by a software process performed by control device 300 or a hardware process.

Referring to FIG. 6, in a step S11, control device 300 determines whether or not an external load is connected to connection unit 220, based on a signal sent from connection unit 220. When control device 300 determines that no external load is connected to connection unit 220 (determined as NO in step S11), the process is terminated without performing a series of subsequent processes.

On the other hand, when it is determined that an external load is connected to connection unit 220 (determined as YES in step S11), control device 300 turns on relays SMRG1 and SMRB2 in a step S12 by activating control signals SEG1 and SEB2 to the H level. Further, control device 300 activates control signals SEB3 and SEG3 to the H level, thereby turning on relays SMRB3 and SMRG3. Accordingly, power storage batteries B1, B2, B3 are electrically connected to one another. Further, power storage device B is electrically connected to SMR 115 and CHR 210.

Next, in a step S13, control device 300 determines whether or not battery voltage VB detected by voltage sensor 105 falls within a normal range. When it is determined that battery voltage VB falls out of the normal range (determined as NO in step S13), control device 300 terminates the process without performing the series of subsequent processes.

On the other hand, when it is determined that battery voltage VB falls within the normal range (determined as YES in step S13), control device 300 turns on relays SMRB1 and SMRP in a step S14 by activating control signals SEB1 and SEP to the H level. In this way, electric power is started to be supplied from DC power source 110A to positive bus PL1 and negative bus NL1.

Capacitor C1 is charged with the electric power supplied to positive bus PL1 and negative bus NL1. In step S15, control device 300 charges capacitor C1 to a voltage Vth1 set in advance, based on DC voltage VL detected by voltage sensor 125.

When DC voltage VL reaches voltage Vth1, control device 300 deactivates control signals SEG1 and SEB2 to the L level in a step S16, thereby turning off relays SMRG1 and SMRB2. Further, control device 300 deactivates control signals SEB3 and SEG3 to the L level, thereby turning off relays SMRB3 and SMRG3. In this way, electric connection among power storage batteries B1 to B3 is disconnected. Further, electric connection between power storage device B and each of SMR 115 and CHR 210 is disconnected, thereby disconnecting the discharging path of power storage device B.

Further, control device 300 activates control signals CEB and CEG to the H level in a step S17, thereby turning on relays CHRB and CHRG. In this way, positive bus PL1 and negative bus NL1 are electrically connected to positive bus PL3 and negative bus NL3. The DC voltage is supplied from capacitor C1 to capacitor C3 via positive bus PL1, relays SMRB1, CHRB, and positive bus PL3, thereby charging capacitor C3. In a step S18, control device 300 charges capacitor C3 to a voltage Vth2 set in advance, based on DC voltage VC detected by voltage sensor 205.

When DC voltage VC reaches voltage Vth2, control device 300 deactivates control signals SEB1 and SEP to the L level in a step S19, thereby turning off relays SMRB1 and SMRP. In this way, power storage device B is disconnected from positive bus PL1 and negative bus NL1. Further, control device 300 activates control signals SEG1 and SEB2 to the H level in a step S20, thereby turning on relays SMRG1 and SMRB2. Also, control device 300 activates control signals SEB3 and SEG3 to the H level, thereby turning on relays SMRB3 and SMRG3. In this way, power storage device B is electrically connected to positive bus PL3 and negative bus NL3.

Next, control device 300 generates control signal PWD for converting the DC power, which is supplied from power storage device B, into AC power that can be supplied to the external load. This control signal PWD is sent to bidirectional AC/DC converter 215. In this way, electric power is started to be supplied from power storage device B to the external load.

It should be noted that by turning off relays SMRG1, SMRB2, SMRB3, and SMRG3 in step S16, the discharging path of power storage device B is disconnected, but the discharging path may be disconnected by turning off at least one of these relays.

[Third Embodiment]

In a third embodiment of the present invention, the following describes a configuration of a power source system for precharging capacitor C3 in stages as well as a process concerned with the precharging of capacitor C3 in the power source system. In the third embodiment, it is illustrated that capacitor C3 is precharged in two stages. It should be noted that the configuration of the power source system in the third embodiment of the present invention is the same as that in FIG. 1 and FIG. 2 apart from the charging relay (CHR 212), and therefore is not described repeatedly in detail.

Figure 7:
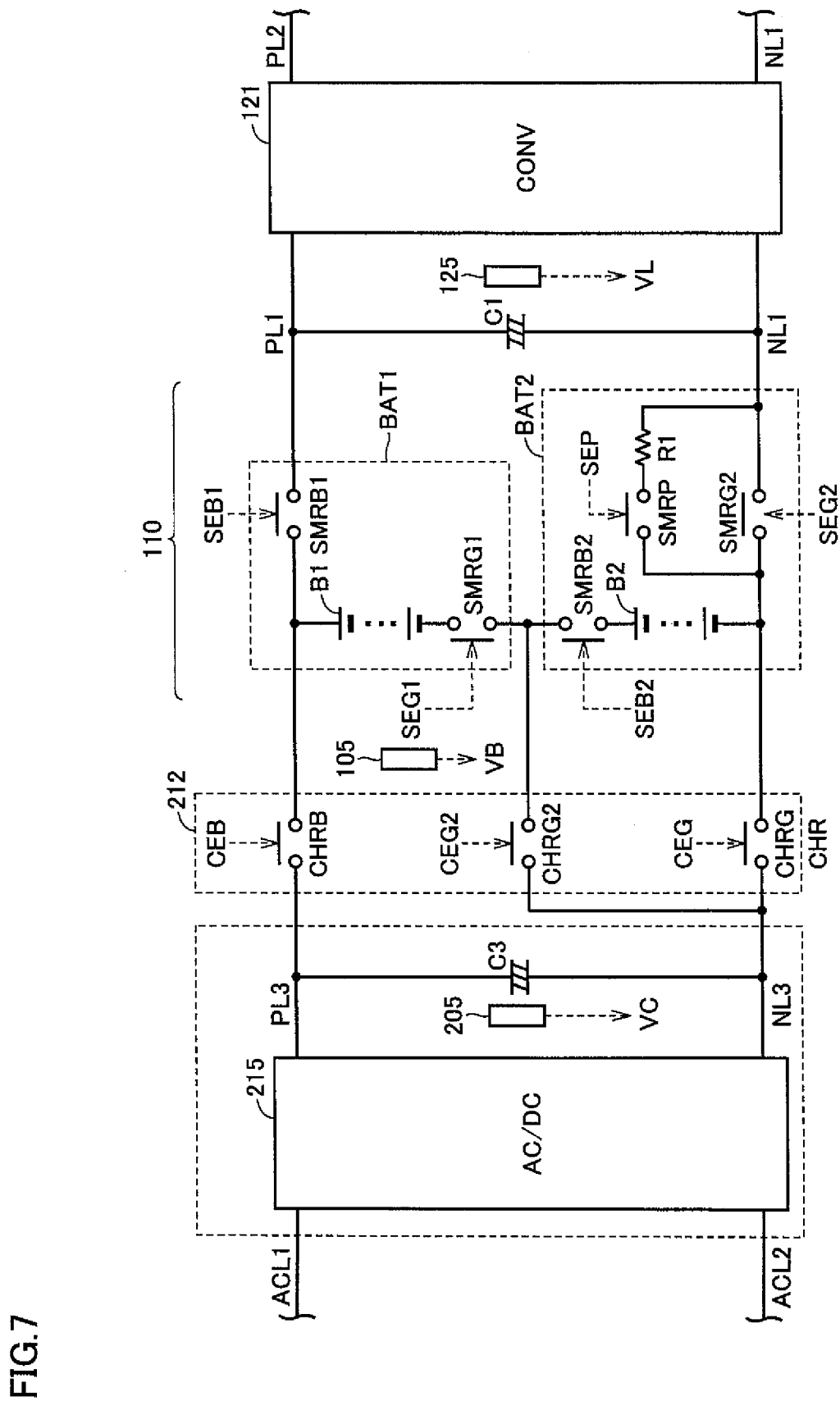
FIG. 7 illustrates an operation of a power source system according to a third embodiment of the present invention.

FIG. 7 illustrates an operation of the power source system according to the third embodiment of the present invention.

Referring to FIG. 7, in the power source system according to the third embodiment, CHR 212 includes a relay CHRB, a relay CHRG, and a relay CHRG2. Relay CHRB is connected between the positive electrode terminal of power storage battery B1 and positive bus PL3. Relay CHRG is connected between the negative electrode terminal of power storage battery B2 and negative bus NL3. Relay CHRB is turned on/off based on a control signal CEB sent from control device 300. Relay CHRG is turned on/off based on a control signal CEG sent from control device 300.

Relay CHRG2 is connected between negative bus NL3 and a connection point of battery pack BAT1 and battery pack BAT2. Relay CHRG2 is turned on/off based on a control signal CEG2 sent from control device 300.

The power source system according to the third embodiment is different from the power source system of the first embodiment shown in FIG. 2, in that charging relay CHR is newly provided with relay CHRG2 for electrically connecting or disconnecting negative bus NL3 and the connection point of the plurality of power storage batteries B1, B2 to or from each other. In the third embodiment, in the case where DC power is supplied from power storage device B (power storage batteries B1 and B2) to the external load, control device 300 precharges capacitor C3 in stages by performing on/off control for this relay CHRG2.

Figure 8:
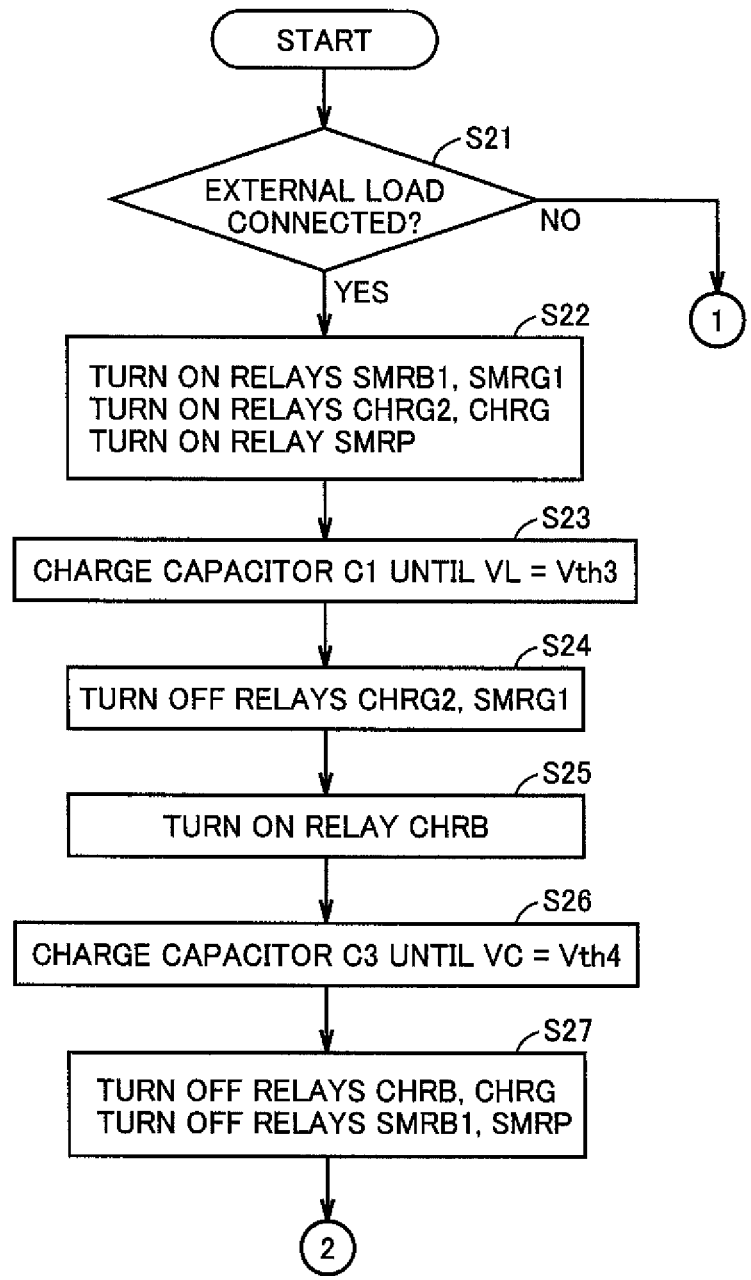
FIG. 8 is a flowchart for illustrating a process concerned with precharging of a capacitor by the control device in the third embodiment.
Figure 9:
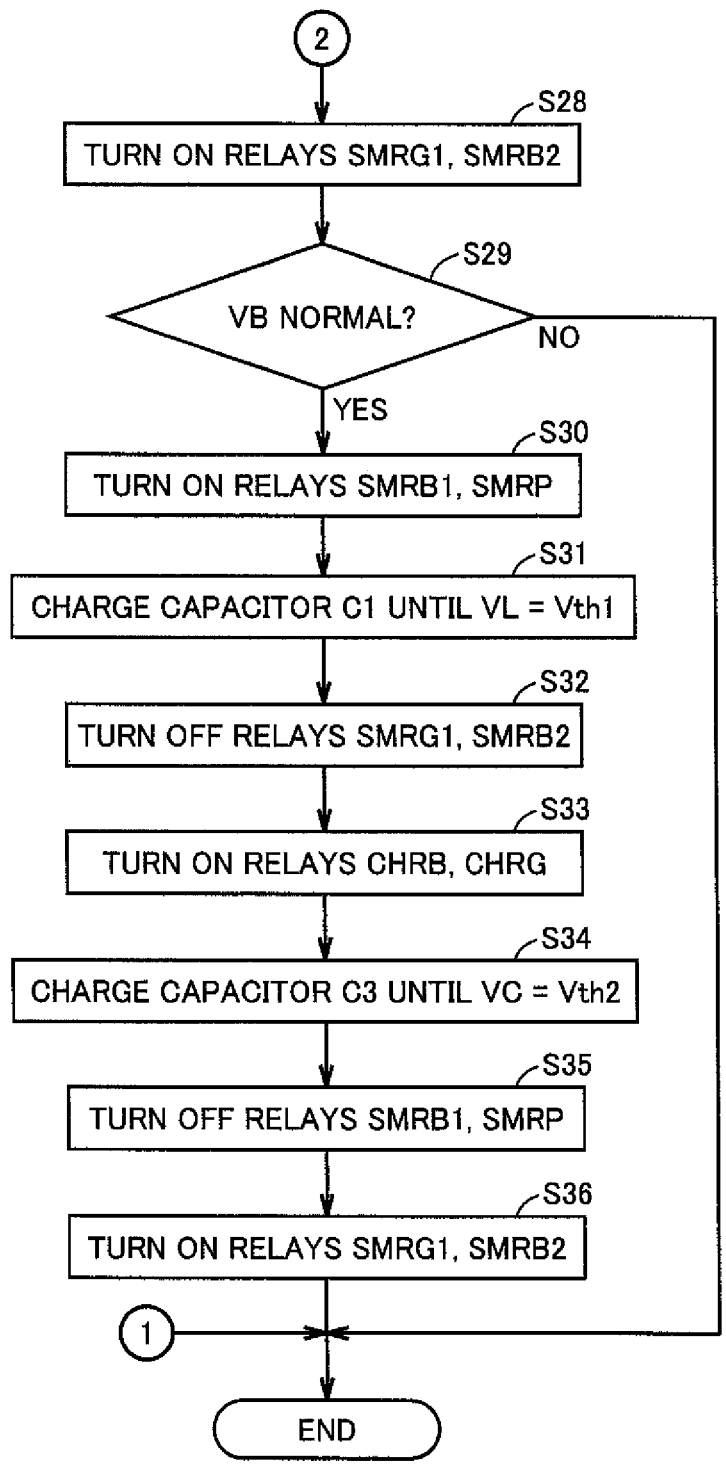
FIG. 9 is a flowchart for illustrating a process concerned with precharging of a capacitor by a control device in the third embodiment.

Each of FIG. 8 and FIG. 9 is a flowchart for illustrating a process concerned with the precharging of capacitor C3 by control device 300 in the third embodiment. It should be noted that the process of this flowchart is invoked from a predetermined main routine and performed whenever a certain period of time passes or a predetermined condition is established. Further, it is assumed that each of the steps of the flowchart of each of FIG. 8 and FIG. 9 is implemented by a software process performed by control device 300 or a hardware process.

Referring to FIG. 8, in a step S21, control device 300 determines whether or not an external load is connected to connection unit 220, based on a signal sent from connection unit 220. When control device 300 determines that no external load is connected to connection unit 220 (determined as NO in step S21), the process is terminated without performing a series of subsequent processes.

On the other hand, when it is determined that the external load is connected to connection unit 220 (determined as YES in step S21), control device 300 turns on relays SMRB1 and SMRG1 in a step S22 by activating control signals SEB1 and SEG1 to the H level. Further, control device 300 activates control signals CEG2 and CEG to the H level, thereby turning on relays CHRG2 and CHRG. Control device 300 further activates control signal SER to the H level, thereby turning on relay SMRP. In this way, in the power source system, a power path is formed between power storage battery B1 of battery pack BAT1 and capacitor C1, the power path including relays SMRG1, CHRG2, CHRG and SMRP, positive bus PL1, and negative buses NL1, NL3. The DC voltage output from power storage battery B1 is supplied to capacitor C1 via the power path, thereby charging capacitor C1. In a step S23, control device 300 charges capacitor C1 to a voltage Vth3 set in advance, based on DC voltage VL detected by voltage sensor 125.

When DC voltage VL reaches voltage Vth3, control device 300 deactivates control signals CEG2 and SEG1 to the L level in a step S24, thereby turning off relays CHRG2 and SMRG1. In this way, the discharging path of power storage battery B1 is disconnected.

Next, control device 300 activates control signal CEB to the H level in a step S25, thereby turning on relay CHRB. In this way, positive bus PL1 and negative bus NL1 are electrically connected to positive bus PL3 and negative bus NL3. The DC voltage is supplied from capacitor C1 to capacitor C3 via positive bus PL1, relays SMRB1, CHRB, and positive bus PL3, thereby charging capacitor C3. In a step S26, control device 300 charges capacitor C3 to a voltage Vth4 set in advance, based on DC voltage VC detected by voltage sensor 205. The charging of capacitor C3 on this occasion corresponds to a first stage of the above-described two stages.

When DC voltage VC reaches a voltage Vth4, control device 300 deactivates control signals CEB and CEG to the L level in a step S27, thereby turning off relays CHRB and CHRG. Further, control device 300 deactivates control signals SEB1 and SEP to the L level, thereby turning off relays SMRB1 and SMRP.

Next, referring to FIG. 9, control device 300 activates control signals SEG1 and SEB2 to the H level in a step S28, thereby turning on relays SMRG1 and SMRB2. Accordingly, power storage battery B1 and power storage battery B2 are electrically connected to each other. Further, power storage device B is electrically connected to SMR 115 and CHR 210.

Next, in a step S29, control device 300 determines whether or not battery voltage VB detected by voltage sensor 105 falls within a normal range. When it is determined that battery voltage VB falls out of the normal range (determined as NO in step S29), control device 300 terminates the process without performing the series of subsequent processes.

On the other hand, when it is determined that battery voltage VB falls within the normal range (determined as YES in step S29), control device 300 turns on relays SMRB1 and SMRP in a step S30 by activating control signals SEB1 and SEP to the H level. In this way, electric power is started to be supplied from DC power source 110 to positive bus PL1 and negative bus NL1.

Capacitor C1 is charged with the electric power supplied to positive bus PL1 and negative bus NL1. In a step S31, control device 300 charges capacitor C1 to a voltage Vth1 set in advance, based on DC voltage VL detected by voltage sensor 125.

When DC voltage VL reaches voltage Vth1, control device 300 deactivates control signals SEG1 and SEB2 to the L level in a step S32, thereby turning off relays SMRG1 and SMRB2. In this way, electric connection between power storage battery B1 and power storage battery B2 is disconnected. Further, electric connection between power storage device B and each of SMR 115 and CHR 210 is disconnected, thereby disconnecting the discharging path of power storage device B.

Further, control device 300 activates control signals CEB and CEG to the H level in a step S33, thereby turning on relays CHRB and CHRG. In this way, positive bus PL1 and negative bus NL1 are electrically connected to positive bus PL3 and negative bus NL3. The DC voltage is supplied from capacitor C1 to capacitor C3 via positive bus PL1, relays SMRB1, CHRB, and positive bus PL3, thereby charging capacitor C3. In a step S34, control device 300 charges capacitor C3 to a voltage Vth2 set in advance, based on DC voltage VC detected by voltage sensor 205. The charging of capacitor C3 on this occasion corresponds to a second stage subsequent to the above-described first stage.

When DC voltage VC reaches voltage Vth2, control device 300 deactivates control signals SEB1 and SEP to the L level in a step S35, thereby turning off relays SMRB1 and SMRP. In this way, power storage device B is disconnected from positive bus PL1 and negative bus NL1. Further, control device 300 activates control signals SEG1 and SEB2 to the H level in a step S36, thereby turning on relays SMRG1 and SMRB2. In this way, power storage device B is electrically connected to positive bus PL3 and negative bus NL3.

Next, control device 300 generates control signal PWD for converting the DC power, which is supplied from power storage device B, into AC power that can be supplied to the external load. This control signal PWD is sent to bidirectional AC/DC converter 215. In this way, electric power is started to be supplied from power storage device B to the external load.

Here, voltage Vth3 in step S23 is used to determine whether or not capacitor C1 has been charged until voltage VL of capacitor C1 becomes substantially equal to the DC voltage output from power storage battery B1. This voltage Vth3 usable herein is of a value such that the absolute value of a difference from the voltage of power storage battery B1 falls within a range equal to or less than a predetermined threshold value. When voltage VL of capacitor C1 reaches voltage Vth3, control device 300 determines that a first condition of ending the charging of capacitor C1 is established, and disconnects the discharging path of power storage device B in step S24. Then, in step S25, electric power stored in capacitor C1 is employed to charge capacitor C3.

Further, voltage Vth4 in step S26 is used to determine whether or not the first stage of charging capacitor C3 has been completed. This voltage Vth4 is set based on voltage Vth3, capacitances of capacitors C1, C3, and the like. Further, voltage Vth2 in step S34 is used to determine whether or not the second stage of charging capacitor C3 has been completed. It should be noted that this voltage Vth2 is used to determine whether or not capacitor C3 has been charged until voltage VC of capacitor C3 becomes substantially equal to battery voltage VB as described in the first embodiment. By charging capacitor C3 until voltage VC becomes substantially equal to battery voltage VB, voltage difference between voltage VC of capacitor C3 and battery voltage VB is made small even when turning on relays SMRG1 and SMRB2 in step S36, thereby preventing occurrence of inrush current.

Figure 10:
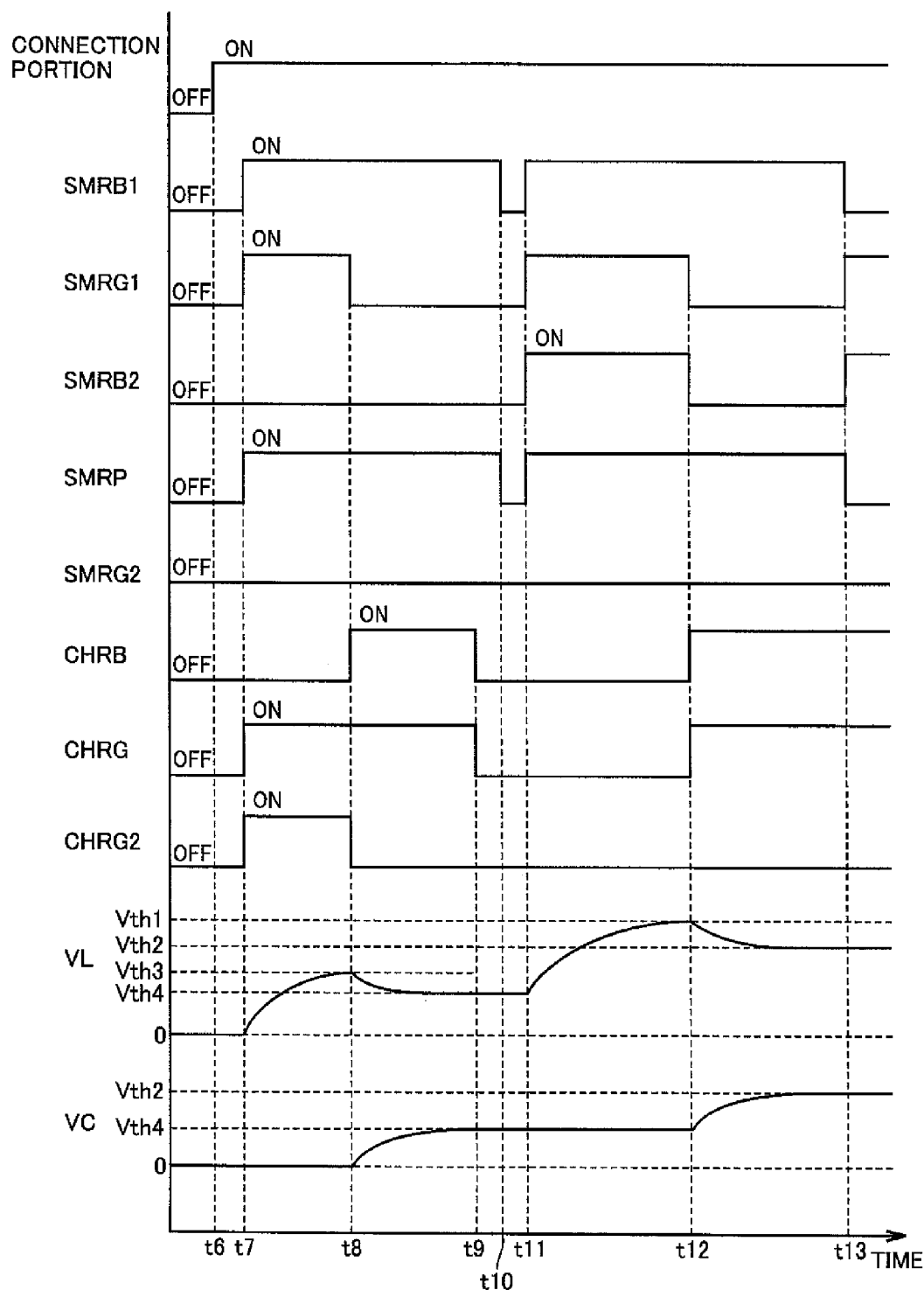
FIG. 10 is a timing chart for illustrating on/off control over a relay when starting the external power supply.

FIG. 10 is a timing chart for illustrating on/off control over the relays when starting the external power supply.

Referring to FIG. 10, when an external load is connected to connection unit 220 at a time t6, relays SMRB1, SMRG1, SMRP, CHRG, and CHRG2 are turned on at a time t7. In this way, the DC voltage supplied from power storage battery B1 is supplied to capacitor C1 via resistor R1 for precharging, thereby starting the charging of capacitor C1. Voltage VL of capacitor C1 is gradually increased after a time t7 at which the charging of capacitor C1 is started.

When voltage VL reaches voltage Vth3 at a time t8, relays SMRG1 and CHRG2 are turned off and relay CHRB are turned on. DC voltage VL of capacitor C1 is supplied to capacitor C3 via positive bus PL1, relays SMRB1 and CHRB, and positive bus PL3, thereby starting the discharging of capacitor C1 and charging of capacitor C3. In this way, after time t8, voltage VL is decreased and voltage VC is increased. The charging of capacitor C3 on this occasion corresponds to the first stage illustrated in step S26 of FIG. 8.

When voltage VC reaches voltage Vth4 at a time t9, relays CHRB and CHRG are turned on. Next, at a time t10, relays SMRB1 and SMRP are turned off. In this way, the first stage is ended.

Next, when relays SMRB1, SMRG1, SMRB2, and SMRP are tuned on at a time t11, DC voltage VB supplied from power storage device B (power storage batteries B1 and B2) is supplied to capacitor C1 via relays SMRB1 and SMRP, thereby starting charging of capacitor C1. On this occasion, voltage VL of capacitor C1 is gradually increased after a time t11 at which the charging of capacitor C1 is started.

When voltage VL reaches voltage Vth1 at a time t12, relays SMRG1 and SMRB2 are turned off and relays CHRB and CHRG are turned on. DC voltage VL of capacitor C1 is supplied to capacitor C3 via positive bus PL1, relays SMRB1 and CHRB, and positive bus PL3, thereby starting discharging of capacitor C1 and charging of capacitor C3. In this way, after time t12, voltage VL is decreased and voltage VC is increased. The charging of capacitor C3 on this occasion corresponds to the second stage illustrated in step S34 of FIG. 8.

When voltage VC reaches voltage Vth2 at a time t13, relays SMRB1 and SMRP are turned off and relays SMRG1 and SMRB2 are turned on again. In this way, the second stage is ended and power storage device B is electrically connected to positive bus PL3 and negative bus NL3.

As described above, in the third embodiment of the present invention, capacitor C3 is precharged in the two stages in accordance with such a fact that DC power source 110 is formed of two battery packs BAT1, BAT2. In the first stage, capacitor C3 is charged with electric power supplied from capacitor C1 charged with output power of battery pack BAT1 (power storage battery B1). In the second stage subsequent to the first stage, capacitor C3 is charged with electric power supplied from capacitor C1 charged with output power of battery pack BAT1 (power storage battery B1) and output power of battery pack BAT2 (power storage battery B2).

In each of the first stage and the second stage, each of relay SMRP and resistor R1 for precharging in battery pack BAT2 serves as a current limiting element for capacitors C1 and C3. Because capacitor C3 is precharged in the two stages, precharging resistor R1 for limiting the precharging current for capacitor C3 can have a small resistance value. Hence, even when the number of the battery packs included in DC power source 110 is increased, for example, even when the number of the battery packs is changed from one battery pack BAT2 to two battery packs BAT1 and BAT2, precharging resistor R1 provided in battery pack BAT2 can be used to precharge capacitor C3 without any modification (i.e., without increasing the resistance value thereof). As a result, increase of power loss in precharging resistor R1 can be suppressed and the configuration of the power source system can be simplified.

It should be noted that in the case where the number of battery packs included in DC power source 110 is further increased, a similar effect can be obtained by adding a relay CHRG2 in CHR 212 for the newly added battery pack.

Regarding correspondence between the present embodiment and the configuration of the present invention, positive bus PL1 and negative bus NL1 correspond to a "first pair of power lines" in the present invention, and capacitor C1 corresponds to a "first capacitor" in the present invention. Moreover, positive bus PL3 and negative bus NL3 correspond to a "second pair of power lines" in the present invention, and capacitor C3 corresponds to a "second capacitor" in the present invention. Further, SMR 115 (relays SMRB1, SMRG2, SMRP, R1) corresponds to the "first opening/closing device" in the present invention, CHR 210 (relays CHRB, CHRG) corresponds to the "second opening/closing device" in the present invention, and relays SMRG1, SMRB2 correspond to the "third opening/closing device" in the present invention.

It should be noted that the load of the power source system is not particularly limited and the configuration in FIG. 1 is just exemplary. Further, for vehicles to which the power source system is applied, there may be employed other configurations, which drive a motor, than electrically powered vehicles such as hybrid vehicles or electric vehicles.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be applied to a power source system of an electrically powered vehicle that is capable of supplying electric power from a power storage device of the vehicle to an external load.

REFERENCE SIGNS LIST

100: vehicle; 105, 125, 205: voltage sensor; 110, 110A: DC power source; 121: converter; 122, 123: inverter; 130, 135: motor generator; 140: power transmission gear; 150: driving wheel; 160: engine; 200: charging device; 210, 212: CHR; 215: bidirectional AC/DC converter; 220: connection unit; 300: control device; 400: charging cable; 410: charging connector; 420: plug; 430: electric wire portion; 500: external power source; 510: receptacle; ACL1, ACL2: power line; B: power storage device; B1, B2, B3: power storage battery; BAT1, BAT2, BAT3: battery pack; C1, C2, C3: capacitor; CHRB, CHRG, CHRG2, SMRB1, SMRB2, SMRB3, SMRG1, SMRG2, SMRG3, SMRP: relay; R1: resistor.

The invention claimed is:

1. A power source system comprising:
    a power storage device capable of charging/discharging;
    a first pair of power lines connected to said power storage device via a first opening/closing device;
    a first capacitor connected between said first pair of power lines;
    a second pair of power lines connected to said power storage device via a second opening/closing device;
    a second capacitor connected between said second pair of power lines; and
    a third opening/closing device for opening/closing an electric conduction path between said power storage device and each of said first opening/closing device and said second opening/closing device,
    said first opening/closing device including
        a first relay connected between one electrode of said power storage device and one power line of said first pair of power lines, and
        a second relay and a resistor connected in series between the other electrode of said power storage device and the other power line of said first pair of power lines,
    the power source system further comprising a control device for charging said first capacitor by turning on said first relay and said second relay and closing said third opening/closing device, and thereafter charging said second capacitor by closing said second opening/closing device and opening said third opening/closing device,
    wherein said first capacitor is charged with electric power supplied from said power storage device provided via said first relay, said second relay, said resistor, and said first pair of power lines, and
    thereafter, said power storage device is disconnected from said first pair of power lines, and said second capacitor is charged with electric power supplied from said first capacitor via said first relay, said second opening/closing device, said second relay, said resistor, said first pair of power lines, and said second pair of power lines.

2. The power source system according to claim 1, wherein said power storage device is formed of a plurality of power storage batteries connected in series, and
    said third opening/closing device is provided between said plurality of power storage batteries.

3. The power source system according to claim 2, further comprising a power converter for bidirectionally converting electric power between said power storage device and an external load or an external power device via said second pair of power lines, wherein
    said second capacitor is provided between said second opening/closing device and said power converter, and
    when starting to supply electric power from said power storage device to an external load, said control device charges said first capacitor by turning on said first relay and said second relay and closing said third opening/closing device, and thereafter charges said second capacitor by closing said second opening/closing device and opening said third opening/closing device.

4. The power source system according to claim 3, further comprising:
    an AC motor for generating vehicle driving power; and
    a power conversion unit for bidirectionally converting electric power between said power storage device and said AC motor via said first pair of power lines, wherein
    said first capacitor is provided between said first opening/closing device and said power conversion unit, and
    when starting to supply electric power from said power storage device to said power conversion unit, said control device charges said first capacitor by turning on said first relay and said second relay and closing said third opening/closing device.

5. The power source system according to claim 1, further comprising a power converter for bidirectionally converting electric power between said power storage device and an external load or an external power device via said second pair of power lines, wherein
    said second capacitor is provided between said second opening/closing device and said power converter, and
    when starting to supply electric power from said power storage device to an external load, said control device charges said first capacitor by turning on said first relay and said second relay and closing said third opening/closing device, and thereafter charges said second capacitor by closing said second opening/closing device and opening said third opening/closing device.

6. The power source system according to claim 5, further comprising:
    an AC motor for generating vehicle driving power; and
    a power conversion unit for bidirectionally converting electric power between said power storage device and said AC motor via said first pair of power lines, wherein
    said first capacitor is provided between said first opening/closing device and said power conversion unit, and
    when starting to supply electric power from said power storage device to said power conversion unit said control device charges said first capacitor by turning on said first relay and said second relay and closing said third opening/closing device.

7. The power source system according to claim 1, wherein said power storage device is formed of a plurality of power storage batteries connected in series,
    said third opening/closing device is provided between said plurality of power storage batteries, and
    said second opening/closing device includes
        a third relay connected between one electrode of said power storage device and one power line of said second pair of power lines,
        a fourth relay connected between the other electrode of said power storage device and the other power line of said second pair of power lines, and
        a fifth relay connected between a connection point of said third opening/closing device and the other power line of said second pair of power lines.

8. The power source system according to claim 7, wherein said third operating/controlling device includes a sixth relay and a seventh relay connected in series between a first power storage battery and a second power storage that is connected to said first power storage battery of said plurality of power storage batteries, said fifth is connected between a connection point of said sixth relay and said seventh relay and the other power line of said second pair of power lines, said control device is configured to provide: a first period in which said first capacitor is charged by turning on said first relay, said second relay, said fourth relay, said fifth relay and said sixth relay and opening said seventh relay; a second period in which said second capacitor is charged by turning on said third relay and turning off said fifth relay and said sixth relay after said first period; a third period in which said first capacitor is charged by turning on said first relay, said second relay, said sixth relay and said seventh relay after said second period; and a fourth period in which said second capacitor is charged by turning on said third relay and fourth relay and turning off said sixth relay and said seventh relay after said third period.

9. A vehicle comprising:

a power source system; and a motor that receives electric power from the power source system to generate vehicle driving power, the power source system including a power storage device capable of charging/discharging, a first pair of power lines connected to said power storage device via a first opening/closing device, a first capacitor connected between said first pair of power lines, a second pair of power lines connected to said power storage device via a second opening/closing device, a second capacitor connected between said second pair of power lines, and a third opening/closing device for opening/closing an electric conduction path between said power storage device and each of said first opening/closing device and said second opening/closing device, said first opening/closing device including a first relay connected between one electrode of said power storage device and one power line of said first pair of power lines, and a second relay and a resistor connected in series between the other electrode of said power storage device and the other power line of said first pair of power lines, the power source system further including a control device for charging said first capacitor by turning on said first relay and said second relay and closing said third opening/closing device, and thereafter charging said second capacitor by closing said second opening/closing device and opening said third opening/closing device, wherein said first capacitor is charged with electric power supplied from said power storage device provided via said first relay, said second relay, said resistor, and said first pair of power lines, and thereafter, said power storage device is disconnected from said first pair of power lines, and said second capacitor is charged with electric power supplied from said first capacitor via said first relay, said second opening/closing device, said second relay, said resistor, said first pair of power lines, and said second pair of power lines.

10. A method for controlling a power source system, the power source system including a power storage device capable of charging/discharging, a first pair of power lines connected to said power storage device via a first opening/closing device, a first capacitor connected between said first pair of power lines, a second pair of power lines connected to said power storage device via a second opening/closing device, a second capacitor connected between said second pair of power lines, and a third opening/closing device for opening/closing an electric conduction path between said power storage device and each of said first opening/closing device and said second opening/closing device, said first opening/closing device including a first relay connected between one electrode of said power storage device and one power line of said first pair of power lines, and a second relay and a resistor connected in series between the other electrode of said power storage device and the other power line of said first pair of power lines, the method comprising the steps of:

charging said first capacitor by turning on said first relay and said second relay and closing said third opening/closing device; and charging said second capacitor by closing said second opening/closing device and opening said third opening/closing device after charging said first capacitor, wherein said first capacitor is charged with electric power supplied from said power storage device provided via said first relay, said second relay, said resistor, and said first pair of power lines, and thereafter, said power storage device is disconnected from said first pair of power lines, and said second capacitor is charged with electric power supplied from said first capacitor via said first relay, said second opening/closing device, said second relay, said resistor, said first pair of power lines, and said second pair of power lines.

* * * * *